United States Patent
Zeuner et al.

(10) Patent No.: US 6,272,969 B1
(45) Date of Patent: Aug. 14, 2001

(54) PNEUMATIC BRAKE BOOSTER WITH REDUCED RESPONSE FORCE

(75) Inventors: Lothar Zeuner, Steineroth; Christoph Linden, Vallendar, both of (DE)

(73) Assignee: Lucas Industries plc (GB)

(*) Notice: Subject to any disclaimer, the term of this patent is extended or adjusted under 35 U.S.C. 154(b) by 0 days.

(21) Appl. No.: 09/568,445

(22) Filed: May 10, 2000

Related U.S. Application Data

(63) Continuation of application No. PCT/EP98/06800, filed on Oct. 27, 1998.

(30) Foreign Application Priority Data

Nov. 13, 1997 (DE) .................................. 197 50 383

(51) Int. Cl.$^7$ .................................................. B60T 13/68
(52) U.S. Cl. ............................... 91/367; 303/3; 303/113.4
(58) Field of Search ................................. 91/367; 303/3, 303/113.3, 113.4

(56) References Cited

U.S. PATENT DOCUMENTS

| | | | |
|---|---|---|---|
| 4,875,740 | * 10/1989 | Takayama | 303/114.3 X |
| 4,978,177 | * 12/1990 | Ingraham et al. | 303/3 |
| 5,460,074 | * 10/1995 | Balz et al. | 91/369.1 |
| 5,479,844 | 1/1996 | Heibel et al. | 91/369.2 |
| 5,590,937 | * 1/1997 | Heibel | 303/125 |
| 5,605,088 | * 2/1997 | Balz et al. | 91/369.1 |
| 5,658,055 | * 8/1997 | Dieringer et al. | 303/114.3 |
| 5,833,327 | 11/1998 | Kozakai | 303/113.4 |
| 5,845,556 | 12/1998 | Tsubouchi et al. | 91/367 |
| 5,937,727 | * 8/1999 | Klesen et al. | 91/367 |
| 5,941,609 | * 8/1999 | Wagner et al. | 303/114.3 |
| 5,951,119 | * 9/1999 | Eckert | 303/113.3 |
| 5,979,292 | * 11/1999 | Klesen et al. | 91/367 |
| 6,070,514 | * 6/2000 | Bayens et al. | 91/367 |
| 6,149,248 | * 11/2000 | Lubbers et al. | 303/113.4 X |
| 6,185,498 | * 2/2001 | Linden et al. | 303/113.3 X |

FOREIGN PATENT DOCUMENTS

| | | |
|---|---|---|
| 44 41 913 | 5/1996 | (DE) . |
| 195 15 848 | 10/1996 | (DE) . |
| 196 17 589 | 11/1997 | (DE) . |

\* cited by examiner

*Primary Examiner*—John E. Ryznic
(74) *Attorney, Agent, or Firm*—MacMillan, Sobanski & Todd, LLC

(57) ABSTRACT

A pneumatic brake booster (10) has a booster housing (12), the interior of which is subdivided by at least one movable wall (22) into a vacuum chamber (24) and a working chamber (26). Projecting into the booster housing (12) is a control valve (28) which, after a response force acting counter to its operating direction has been overcome, controls a pneumatic pressure difference acting upon the movable wall (22). The control valve (28) is operable both by means of a mechanical input element (36) and, independently thereof, by means of an electromagnetic arrangement (48) comprising a coil (58) and an armature (50), which are displaceable relative to one another along the operating direction. To reduce the response force which has to be overcome by a user, a device for detecting an operation of the control valve (28) effected by means of the mechanical input element (36) is provided which, once such an operation has been detected, during said operation prompts an energizing of the electromagnetic arrangement (48) of an intensity sufficient to reduce the response force of the control valve (28) yet not increase the braking force provided by the brake booster in accordance with the operation.

10 Claims, 2 Drawing Sheets

PNEUMATIC BRAKE BOOSTER WITH REDUCED RESPONSE FORCE

CROSS REFERENCE TO RELATED APPLICATIONS

This application is a continuation of International Application No. PCT/EP98/06800 filed Oct. 27, 1998, which claims priority to German Patent Application No. 19750383.7 filed Nov. 13, 1997.

BACKGROUND OF THE INVENTION

The present invention relates to a pneumatic brake booster according to the preamble of claim 1. Such a brake booster is known, for example, from DE 44 41 913 A1.

Brake boosters of the type described above, on the one hand, to are operable in a conventional manner directly mechanically e.g. by depressing a brake pedal coupled to the input element of the brake booster and, on the other hand, are operable by an integrated electromagnetic actuator which is controllable by an electronic control unit usually disposed outside of the brake booster. Said brake boosters therefore allow not only operation dependent on the request of a driver but also automatic operation independent of the request of the driver as well as a combination of said two types of operation, i.e. a blend of driver-requested and automatic operation of the brake booster (so-called braking-assistant function).

Before a pneumatic brake booster actually boosts the operating force introduced into it, its response force has to be overcome. The response force results from the presence of one or more restoring springs which return the components, which are displaced in operating direction during operation of a brake booster, into their normal position after operation is terminated. This is explained in greater detail using as an example the already cited DE 44 41 913 A1. Upon a manually initiated operation of the brake booster, an input force is introduced via a substantially rod-shaped input element into the control valve of the brake booster, where it is transmitted to an operating piston. The input element and the operating piston are thus displaced in operating direction relative to the control valve housing. As the operating piston is mechanically coupled to the armature of the electromagnetic arrangement, the armature is also displaced in operating direction, with the result that a first sealing seat is opened and allows aeration of the working chamber of the brake booster. The input element and the armature (not shown in DE 44 41 913 A1) are resiliently biased counter to operating direction. This means that a counterforce in operating direction corresponding to the resilient bias first has to be overcome before the input element, the operating piston and the armature are displaced in operating direction and may therefore open the first valve seat. Said counterforce is referred to as the response force of the brake booster and/or control valve.

Frequently the restoring spring of the armature is simultaneously a system resetting spring, which resets the first sealing seat. Said resetting task requires an increased amount of restoring force because the restoring spring of the armature has to be able to work against the restoring spring of the valve element associated with the first sealing seat so that, when the pressure on the brake pedal is eased, said valve element is displaced counter to operating direction and so a second sealing seat is opened, which establishes a connection between the working chamber and the vacuum chamber of the brake booster so that the pressure in the working chamber may be reduced. Said function has to be always guaranteed, i.e. neither frictional forces nor counter-acting spring forces may prevent the described opening of the second sealing seat, which is why a specific force surplus in restoring direction is usually provided. Said force surplus ensuring trouble-free functioning of the control valve however leads to an increase of the response force of the control valve. For comfort reasons and also to make the brake system as finely apportionable as possible, a much lower response force is however desirable.

SUMMARY OF THE INVENTION

The object of the invention is to provide a mechanically and electromagnetically operated brake booster, in which the response force to be overcome by a user is noticeably reduced.

On the basis of a brake booster of the type described, said object is achieved according to the invention in that the device for detecting an operation of the control valve effected by means of the mechanical input element, once such an operation has been detected, during said operation prompts an energizing of the electromagnetic arrangement of an intensity sufficient to reduce the response force of the control valve yet not increase the braking force provided by the brake booster in accordance with the operation.

According to the invention, the energizing of the electromagnetic arrangement is therefore, at most, intense enough for the force generated through energizing of the electromagnetic arrangement and acting in operating direction to correspond precisely to the response force acting counter to operating direction. In said case, the operating force summoned up by a driver is fully available as braking force. In dependence upon the response characteristic desired by a vehicle manufacturer, the reduction of the response force of the brake booster and/or its control valve achieved through energizing of the electromagnetic arrangement may however also be less pronounced. According to the invention, a very comfortable brake booster which responds sensitively even to low operating forces is therefore obtained.

In order to realize the apparatus according to the invention, the controller in any case provided in the generic prior art may, for example, have a preset threshold value, from which the energizing of the electromagnetic arrangement in accordance with the invention sets in. The threshold value may be e.g. a specific force, although a predetermined displacement distance which a selected component has to travel may also be used as a threshold value. As a further advantage, the fact that the electromagnetic arrangement is utilized in accordance with the invention during every braking operation prevents the parts of the electromagnetic arrangement from becoming stuck, which may potentially occur in the case of infrequent use.

According to a preferred refinement of the brake booster according to the invention, said energizing of the electromagnetic arrangement ceases during a movement of the input element counter to operating direction, i.e. during a restoring movement. Thus, during a restoring movement the full restoring force of the provided springs acts upon the components which are to be reset.

Advantageously, the intensity of the energizing of the electromagnetic arrangement which reduces the response force is dependent upon the vehicle speed. For example, the reduction of the response force may be less pronounced at relatively low speeds than at high speeds, thereby avoiding a braking system which responds too "harshly" in the bottom speed range.

Said energizing of the electromagnetic arrangement may moreover be dependent upon the type of braking. Thus, for example, the reduction of the response force may be more pronounced when a very quickly initiated braking operation is detected in order to achieve as fast a response of the braking system as possible. On the other hand, in the event of slow, gentle braking the reduction of the response force may be less extreme in order to make the response behaviour of the braking system more comfortable.

According to a development of the brake booster according to the invention, the intensity of said energizing of the electromagnetic arrangement may vary in a driver-specific manner, i.e. the reduction of the response force is geared to the driver's brake operating style, which is established over an extended period. For example, in the case of a driver who operates the brake system predominantly with relatively strong pressure, the reduction of the response force may be less extreme than in the case of a driver who operates the brake system predominantly in a more timid fashion. To said end, the described device for detecting an operation effected by means of the mechanical input element advantageously comprises a learning algorithm, which is stored in a microprocessor. The learning algorithm in cooperation with suitable sensors prepares a driver-specific operating characteristic, as a function of which the energizing of the electromagnetic arrangement is then adapted and optionally varied.

Suitable sensors for acquiring a driver-specific operating characteristic are, for example, a hydraulic pressure sensor in a master cylinder disposed downstream of the brake booster or a force sensor connected to a brake pedal or a motion sensor in the brake booster or alternatively a pressure sensor in the brake booster. Advantageously, the device for detecting an to operation of the control valve and/or brake booster effected by means of the mechanical input element comprises a combination of the previously described sensors.

A basic value for said energizing of the electromagnetic arrangement which reduces the response force may, for example, already be determined during production of the brake booster according to the invention. For said purpose it is possible, e.g. after assembly of the brake booster according to the invention, to simulate a typical operating state without energizing of the electromagnetic arrangement, which allows the response force of said brake booster to be measured. It is then easy to define a current value for the electromagnetic arrangement which reduces the measured response force to a desired response force. Thus, all brake boosters of a series may be set to a specific response force independently of manufacturing tolerances.

Alternatively, according to a development of the brake booster according to the invention, the response force may be determined automatically, e.g. through a comparison of the input force introduced into the brake booster with the resultant hydraulic pressure in a master cylinder disposed downstream of the brake booster. Said automatic determination of the response force may be effected in the installed state of the brake booster, i.e. in the vehicle. Preferentially, the previously described sensors, which are used to determine driver-specific parameters, are also used to determine the introduced force and the resultant hydraulic pressure.

The reduction of the response force of a brake booster through said energizing of the electromagnetic arrangement in accordance with the invention is not restricted to specific designs of brake booster as the only requirement is the provision of an electromagnetic arrangement.

DETAILED DESCRIPTION OF THE INVENTION

Figure 1:
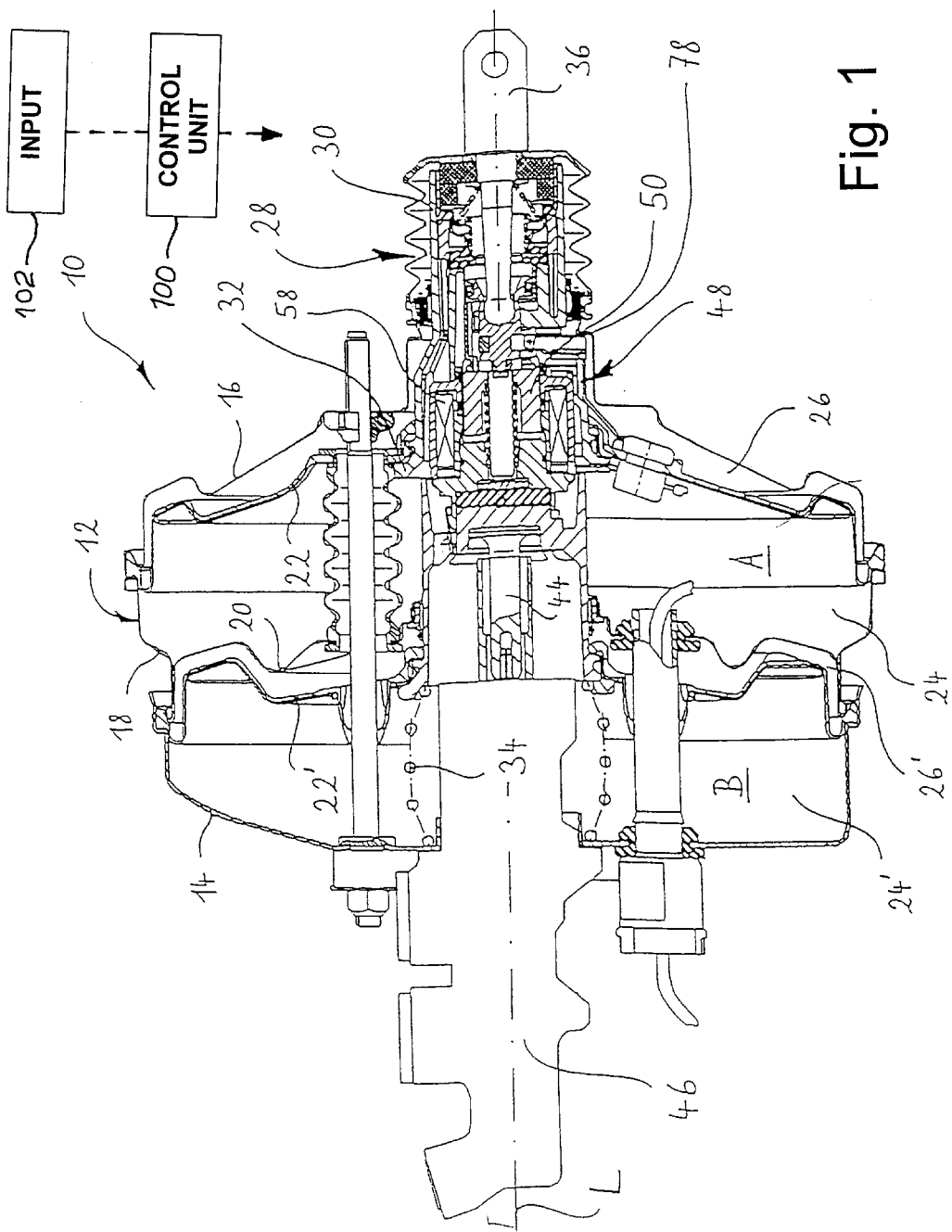
FIG. 1 is a longitudinal section through a brake booster according to the invention.
Figure 2:
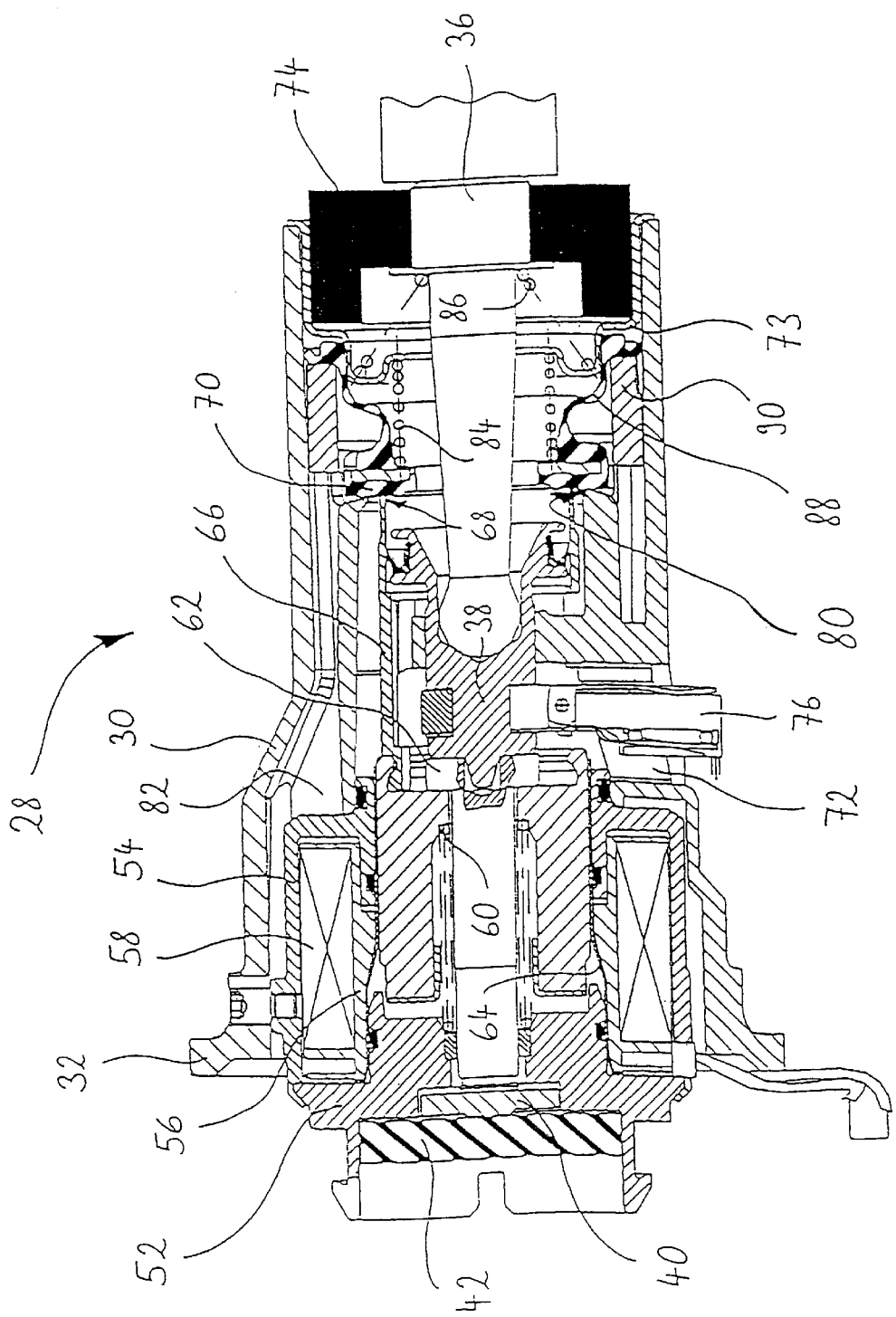
FIG. 2 is a longitudinal section through the control valve of the brake booster of FIG. 1 to an enlarged scale.

FIG. 1 shows a so-called tandem-style vacuum brake booster 10. The brake booster 10 has a booster housing 12, which is substantially rotationally symmetric relative to an axis L and formed by two half-shells 14 and 16 as well as by an annular intermediate piece 18. The interior of the booster housing 12 is split by a rigid wall 20 into a sub-chamber A and a sub-chamber B. Each of the sub-chambers A and B is subdivided by a movable wall 22, 22', which is displaceable along the axis L, into a vacuum chamber 24, 24' and a working chamber 26, 26'. In the following, only the sub-chamber A with its movable wall 22 is described in detail; the function of the sub-chamber B however corresponds to the function of the sub-chamber A.

Projecting along the axis L into the booster housing 12 is a control valve 28 for controlling a pneumatic pressure difference acting upon the movable wall 22. The control valve 28 has a control valve housing 30 and is accommodated in a displaceable and sealing manner in an axially outward-projecting, cylindrical neck of the booster housing 12. In the sub-chamber A of the booster housing 12, the movable wall 22 is fastened in a sealing and force-transmitting manner to a circumferential radial flange 32 of the control valve housing 30. A restoring spring 34 preloads the control valve housing 30 together with the movable wall 22 into the illustrated normal position.

The control valve 28, and hence the brake booster 10, is operable by means of a mechanical input element 36, which projects axially into the control valve housing 30 and acts in the control valve 28 upon an operating piston 38 and is connected at its other end e.g. to a brake pedal (not shown here). The operating piston 38 penetrates the control valve housing 30 and transmits the operating force introduced by the input element 36 to a so-called sensing disk 40, which is accommodated in a corresponding recess of an armature counterpart of an electromagnetic arrangement described in detail below. The sensing disk 40 in turn acts upon a larger-diameter rubber-elastic reaction disk 42, which is likewise accommodated in the armature counterpart and transmits the operating force to an input piston 44 of a hydraulic master cylinder 46 (shown here only in outline), which is fitted to the negative-pressure booster housing half.

For operating the brake booster 10 automatically, i.e. independently of the request of a driver, the control valve 28 comprises an electromagnetic arrangement 48, which is accommodated in a part of the control valve housing 30 widened in a stepped manner and comprises a hollow-cylindrical armature 50, an armature counterpart 52, a coil housing 54 rigidly connected to the armature counterpart 52, and a coil which is accommodated in the coil housing 54 and carried by a coil holder 56 and surrounds the armature 50 in an annular manner. The electromagnetic arrangement 48 is disposed coaxially with the operating piston 38 and is penetrated by the latter. A compression spring 60 disposed radially between the operating piston 38 and the armature 50 preloads the armature 50 in the direction of the input element 36, i.e. counter to operating direction. The operating piston 38 is coupled in operating direction to the armature 50 by a radially projecting annular collar 62. Situated radially between the armature 50 and the coil housing 54 and/or coil holder 56 is a thin-walled separating sleeve 64 of non-magnetic material, along the inner surface of which the armature 50 may slide axially.

Fastened rigidly to the end face of the armature 50 directed towards the input element 36 is a sleeve 66, which extends coaxially with the axis L and on the free end of which a first annular valve seat 68 is formed. The first valve seat 68 cooperates with an annular valve element 70 and, in the open state, via a radial channel 72 connects the working chamber 26 to atmospheric pressure (or excess pressure), which may flow from outside into the control valve housing 30 through an air filter insert 74 accommodated in a retaining element 73. Projecting through the radial channel 72 of the control valve housing 30 is a crossbar 76 which is fastened to the operating piston 38 and which, upon operation of the control valve 28, delimits the axial movement of the operating piston 38 relative to the control valve housing 30 by coming into contact with the, in the drawings, left side wall of the channel 72 and which, upon a return movement of the operating piston 38 at the end of a braking operation, strikes against a stop 78, which is formed in the booster housing wall and defines the so-called disengaged position (non-operated position) of the brake booster 10.

Formed on the control valve housing 30 concentrically with, and surrounding, the first valve seat 68 is a similarly annular second valve seat 80, which cooperates with the valve element 70 and, in the open state, via an annular channel 82 connects the vacuum chamber 24 to the working chamber 26. The valve element 70 is pressed against the first valve seat 68 and the second valve seat 80 by a compression spring 84, which is supported against a radially inward-projecting flange of the retaining element 73. A further compression spring 86, which is supported by one end against the retaining element 73 and by its other end against the mechanical input element 36, preloads the input element 36 counter to operating direction.

In the illustrated embodiment, the valve element 70 is provided with integrally formed rubber-elastic bellows 88, the free edge of which is thickened and clamped sealingly between a step of the retaining element 73 and an insert 90.

There now follows a detailed description of the function of the brake booster 10 and, in particular, of the control valve 28. When the driver operates the brake pedal (not shown here), he first has to overcome a response force, the magnitude of which corresponds substantially to the force generated by the compression springs 60 and 86 and acting counter to operating direction. Once said response force has been overcome, the input element 36 and the operating piston 38 are displaced out of the normal position shown in the drawings to the left relative to the control valve housing 30. Via the annular collar 62 formed on the operating piston 38 the armature 50 and, with it, the sleeve 66 are also driven in operating direction so that the first valve seat 68 loses its sealing contact with the valve element 70, with the result that the connection of the working chamber 26 to atmospheric pressure is opened. Air flows through the air filter insert 74, via the first valve seat 68 and through the radial channel 72 into the working chamber 26, whereupon a differential pressure builds up at the movable wall 22. Said differential pressure displaces the movable wall 22 and hence the control valve housing 30 to the left, thereby resulting in a corresponding servo force which is transmitted via the input piston 44 to the master cylinder 46.

Upon release of the brake pedal, the forces of the compression springs 60 and 86 move the armature 50, the sleeve 66 coupled to the latter, the operating piston 38 and the input element 36 back to the right, with the result that the first valve seat 68 comes back into sealing contact with the valve element 70. The force of the compression springs 60 and 86 then lifts the valve element 70 off the second valve seat 80, with the result that the connection between the vacuum chamber 24 and the working chamber 26 is opened. The fact that the vacuum chamber 24 is constantly connected to a negative pressure source leads to the desired differential pressure reduction at the movable wall 22 and hence to a diminishing of the servo force generated by the brake booster 10. Upon attainment of a position of equilibrium, the second valve seat 80 is reapplied sealingly against the valve element 70.

An electromagnetic operation of the control valve 28 follows the same sequence. Energizing the electromagnetic arrangement 48 produces between the armature 50 and the armature counterpart 52 a field of force which displaces the armature 50 in operating direction counter to the action of the compression spring 60, with the result that the first valve seat 68 lifts off the valve element 70 and opens the connection between the atmosphere and the working chamber 26. When the electromagnetic arrangement 48 is de-energized, the compression spring 60 pushes the armature 50 and hence the first valve seat 68 back into sealing contact with the valve element 70. The rest of the sequence corresponds to the sequence previously described in connection with a mechanical operation.

To reduce the response force, the brake booster 10 is provided with a device capable of detecting the start of an operation effected by means of the mechanical input element 36. To said end, the device comprises e.g. a force sensor (not shown) on the brake pedal or on the input element 36, which sensor is connected to a control unit, schematically represented as block 100 in FIG. 1, for the electromagnetic arrangement 48.

The energizing of the electromagnetic arrangement 48 by the control unit 100 may be effected by various inputs, schematically represented as block 102 in FIG. 1, as discussed above under the heading Summary Of The Invention. For example, an input such as the vehicle speed may be used to control the intensity of the energizing of the electromagnetic arrangement 48. An input such as the type of braking may be used to control the intensity of the energizing of the electromagnetic arrangement 48. An input, such as the control signal of a learning algorithm for determining a driver-specific operating characteristic may be used to control the intensity of the energizing of the electromagnetic arrangement 48. Various sensors, as described throughout, may also supply an input for the control unit 100. For example, as described above under the heading Summary Of The Invention, the sensors can include a hydraulic pressure sensor in a master cylinder disposed downstream of the brake booster, a force sensor connected to a brake pedal, a motion sensor in the brake booster, or a pressure sensor in the brake booster. As soon as the device detects the start of an operation, the force sensor or another sensor suitable for detecting the start of an operation supplies a signal to the control unit of the electromagnetic arrangement 48, with the result that the control unit slightly energizes the coil 58. The intensity of energization is in said case so selected that the force of the spring 60, which resets the armature 50, is at least partially but at most fully compensated. A user of the brake booster 10 therefore need no longer summon up the component of force summoned up by the electromagnetic arrangement 48 in order to overcome the response force, with the result that for him the response force is correspondingly reduced. A disengagement or withdrawal from operation of the brake booster 10 is likewise detected by the sensor or sensors, with the result that the said energizing of the electromagnetic arrangement 48 ceases upon any restoring movement of the input element 36, the operating piston 38 and the armature 50 in order to utilize the full restoring force of the springs 60 and 86.

Said energizing of the electromagnetic arrangement 48 to reduce the response force of the brake booster 10 may occur with a fixed current value, which reduces the unreduced response force of the brake booster 10 to the desired value. Such a current value is dependent upon the component tolerances of the brake booster 10 and may be determined e.g. during manufacture of a brake booster 10.

As was explained in detail in the introduction to the description, the current value during operation of the brake booster 10 may however also be varied in dependence upon specific parameters. Also, determination of a basic value of the energization need not be effected during production of a brake booster as, given the provision of suitable sensors, this may also be effected automatically in the installed state.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Pneumatic brake booster in particular for motor vehicles, having
   a booster housing having an interior which is subdivided by at least one movable wall into a vacuum chamber and a working chamber,
   a control valve, which projects into the booster housing and, after a response force acting counter to its operating direction has been overcome, controls a pneumatic pressure difference acting upon the movable wall and which is operable both by means of a mechanical input element and also, independently thereof, by means of an electromagnetic arrangement comprising a coil and an armature, which are displaceable relative to one another along the operating direction, and
   a device for detecting an operation of the control valve effected by means of the mechanical input element, characterized in that the device for detecting an operation of the control valve effected by means of the mechanical input element, once such an operation has been detected, during said operation prompts an energizing of the electromagnetic arrangement of an intensity sufficient to reduce the response force of the control valve yet not increase the braking force provided by the brake booster in accordance with the operation.

2. Brake booster according to claim 1, characterized in that said energizing of the electromagnetic arrangement ceases during a movement of the input element counter to operating direction.

3. Brake booster according to claim 1, characterized in that the intensity of said energizing of the electromagnetic arrangement is dependent upon the vehicle speed.

4. Brake booster according to claim 1, characterized in that the intensity of said energizing of the electromagnetic arrangement is dependent upon the type of braking.

5. Brake booster according to claim 1, characterized in that the intensity of said energizing of the electromagnetic arrangement varies in a driver-specific manner.

6. Brake booster according to claim 1, characterized in that the device for detecting an operation of the control valve effected by means of the mechanical input element comprises a hydraulic pressure sensor in a master cylinder disposed downstream of the brake booster.

7. Brake booster according to claim 1, characterized in that the response force of the control valve is determined automatically through a comparison of the input force introduced into the brake booster with the resultant hydraulic pressure in a master cylinder disposed downstream of the brake booster.

8. Brake booster according to claim 1, characterized in that the device for detecting an operation of the control valve effected by means of the mechanical input element comprises a force sensor connected to a brake pedal.

9. Brake booster according to claim 1, characterized in that the device for detecting an operation of the control valve effected by means of the mechanical input element comprises a motion sensor in the brake booster.

10. Brake booster according to claim 1, characterized in that the device for detecting an operation of the control valve effected by means of the mechanical input element comprises a pressure sensor in the brake booster.

* * * * *